(12) United States Patent
Morris

(10) Patent No.: US 10,040,408 B2
(45) Date of Patent: *Aug. 7, 2018

(54) WATERLESS TOILET SYSTEM AND METHOD OF USE

(71) Applicant: Sanitation Creations, LLC, Chapel Hill, NC (US)

(72) Inventor: Elizabeth Morris, Chapel Hill, NC (US)

(73) Assignee: SANITATION CREATIONS, LLC, Carrboro, NC (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/172,456

(22) Filed: Jun. 3, 2016

(65) Prior Publication Data

US 2016/0270608 A1 Sep. 22, 2016

Related U.S. Application Data

(63) Continuation-in-part of application No. 14/178,740, filed on Feb. 12, 2014, now Pat. No. 9,357,890, which is a continuation-in-part of application No. 13/772,112, filed on Feb. 20, 2013, now Pat. No. 9,364,124.

(60) Provisional application No. 61/600,747, filed on Feb. 20, 2012.

(51) Int. Cl.
| | | |
|---|---|---|
| A47K 17/00 | (2006.01) | |
| A47K 11/02 | (2006.01) | |
| B60R 15/04 | (2006.01) | |
| A47K 13/30 | (2006.01) | |
| E03D 9/00 | (2006.01) | |
| A47K 13/10 | (2006.01) | |

(52) U.S. Cl.
CPC ............ *B60R 15/04* (2013.01); *A47K 11/026* (2013.01); *A47K 13/30* (2013.01); *E03D 9/005* (2013.01); *A47K 13/10* (2013.01)

(58) Field of Classification Search
CPC ..... A47K 11/06; A47K 11/026; A47K 17/003
USPC ........................................... 4/474, 479, 484
See application file for complete search history.

(56) References Cited

U.S. PATENT DOCUMENTS

| | | | | |
|---|---|---|---|---|
| 3,693,193 | A | * | 9/1972 | May .................................. 4/484 |
| 6,052,842 | A | * | 4/2000 | He .................................... 4/484 |
| 8,122,522 | B2 | * | 2/2012 | Looft ............................... 4/470 |
| 9,364,124 | B2 | | 6/2016 | Morris |
| 2009/0017526 | A1 | * | 1/2009 | Strobel et al. ............. 435/256.5 |

* cited by examiner

*Primary Examiner* — Tuan N Nguyen
(74) *Attorney, Agent, or Firm* — Neo IP

(57) ABSTRACT

An environmentally-friendly, portable waterless toilet for mobile environments that is provides a single-action pedal mechanism to close the lid, advance a continuous bag with waste, and seal the waste in the bag. The toilet uses a continuous bag supply having a predetermined single dose or portion of at least one chemical automatically deposited therein, the at least one chemical functional to kill pathogens in waste that is deposited through an opening in the seat and a corresponding opening of the continuous bag supply. The waste-filled continuous bag supply is at least temporarily sealed by activation of a mechanical sealing mechanism, and released downwardly into a base section, which is connected to a sitting unit, forming an integral, closed system for waterless sanitation.

15 Claims, 23 Drawing Sheets

430

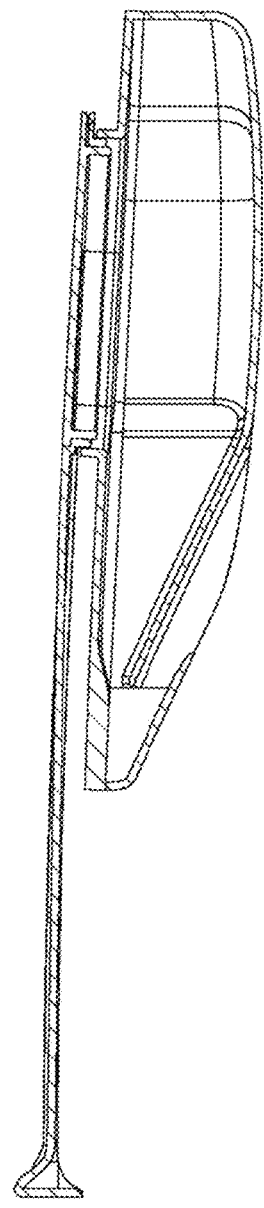
Fig. 15
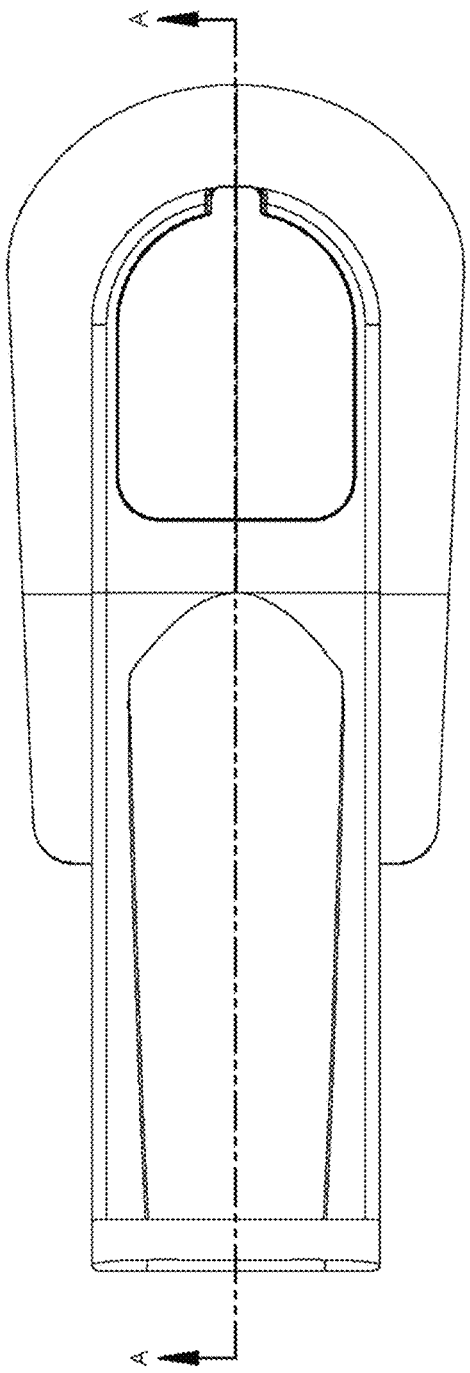
SECTION A-A
SCALE 1:1.5

SECTION D-D

SECTION B-B

WATERLESS TOILET SYSTEM AND METHOD OF USE

CROSS-REFERENCE TO RELATED APPLICATIONS

This application is a continuation-in-part of U.S. patent application Ser. No. 14/178,740, filed Feb. 12, 2014, which is a continuation-in-part of U.S. patent application Ser. No. 13/772,112, filed Feb. 20, 2013, which claims the benefit of U.S. provisional patent application No. 61/600,747, filed Feb. 20, 2012, each of which are incorporated herein by reference in their entirety.

BACKGROUND OF THE INVENTION

1. Field of the Invention

The present invention relates to toilet systems, and, more particularly, to waterless portable toilet systems.

2. Description of the Prior Art

Prior art includes portable sanitation systems and methods having waterless disposal of waste. Additionally, it is known in the prior art to include bags for receiving the waste from the toilet device.

U.S. Pat. No. 2,671,906, issued Mar. 16, 1954, invented by Pott, for a liner for sanitary closets, describes a sanitary closet comprising: a bowl with a hole in the bottom; a supply of tubular film around the bowl and extending upwardly; and means of drawing the film downwardly through the bowl. It further describes sealing jaws which are operated by a handle to seal an area of the film on itself, securing the waste in a bag formed by the film, and drawn downwardly through the hole of the bowl.

U.S. Pat. No. 3,401,409, issued Sep. 17, 1968, invented by Ekrut, for a waste disposal unit, describes a unit for sanitary disposal of human waste, especially for use in vehicles such as buses, airplanes, trailers, campers, and the like. The waste disposal unit includes: a housing; means adjacent to the top of the housing for suspending in open-mouth position and impermeable heat-sealable waste-receiving bag of thermoplastic film; spaced apart compression means within the housing moveable for squeezing together the sides of the bag adjacent the open end; heating means for sealing the top squeezed together portion of the bag, and a storage means disposed within housing below the sealing means for receiving sealed bags of waste by gravity.

U.S. Pat. No. 3,452,368, issued on Jul. 1, 1969, invented by Couper, for a portable waste disposer, describes a portable waste dispenser, which may be used as a portable toilet which utilizes an elongated plastic bag which is continuously sealed as increments of the bag are passed through the toilet. The seal mechanism includes two pairs of elongated rubber rollers spring-biased together and the amount of elongated plastic tubing that is included in the dispenser is determined by the desired number of "flushes".

U.S. Pat. No. 3,648,302, issued on Mar. 14, 1972, invented by Winters, for a portable waterless water closet, describes a portable waterless water closet in which the waste materials are sealed off and stored for subsequent removal in a disposable bag stored in a magazine beneath the seat. The water closet includes a mechanism that grasps and pulls successive lengths of the bag from the magazine while also providing a double seal to isolate waste materials in the storage compartment from the unused portion of the bag.

U.S. Pat. No. 3,665,522, issued on May 30, 1972, invented by Pactosan et al., for an apparatus for collecting solid or liquid wastes, describes a toilet apparatus for collecting solid or liquid wastes in which one sealed end of a hose of thin, tight, flexible material is adapted to be passed down into a container for receiving the waste. A sealing mechanism comprising welding jaws that press a portion of the hose between them and seal the hose at that position by welding.

U.S. Pat. Nos. 3,693,193 and 3,746,159, issued on Sep. 26, 1972 and Jul. 17, 1973 respectively, for a portable sanitary toilet and for a cartridge package for a sanitary toilet respectively, each invented by May, describe a portable toilet which collects waste in an elongated tube-like plastic bag and further describes a pair of pincher arms below the toilet seat that pinch the opposite sides of the tube together to form an odor-tight seal. The bag is advanced into the waste chamber through depression of a foot crank. The '159 patent describes a cartridge package containing the elongated plastic bag for the sanitary toilet.

U.S. Pat. No. 5,058,218, issued Oct. 22, 1991, invented by Lobbert, for a waterless toilet, describes a waterless toilet for use with containers that accommodate waste and can be sealed tight, including: a seat having multiple depressions, each depression accommodating one container; and means for rotating the seat such that the depressions assume different positions—a first position with a magazine of unused containers and a mechanism for dispensing a container into each depression, a second position at which the toilet can be used, a third position with a magazine that supplies lids for sealing the used containers and a mechanism for dispensing lids to each container, and a fourth position with means for removing a container from each depression and forwarding the container to a waste depot.

U.S. Pat. No. 5,960,487, issued on Oct. 5, 1999, invented by Hawkins et al., for a dry toilet, describes a dry toilet that uses a substantially continuous sheet of disposable bowl lining material to convey the toilet waste out of the toilet bowl for disposal and an apparatus for holding, advancing, separating, and releasing successive portions of the lining sheet.

U.S. Pat. Nos. 6,052,842 and 6,212,701, issued May 16, 2000 and Apr. 10, 2001 respectively, and WIPO Pub. No. WO1997027795, each invented by He, for a waterless closet assembly, comprises: a closet having an inlet and an outlet; an annular seat disposed over the inlet of the closet; a tubular hose having a first portion disposed exteriorly of the closet and a second portion extending upwardly over the annular seat and downwardly through the outlet of the closet; and advancing means for advancing the hose upwardly over the annular seat and downwardly through the closet. Furthermore, these documents describe the advancing means comprising a pair of rollers to pull the tubular hose downwardly and clamping plates to clamp the tubular hose. The '701 patent further describes an automatic dry toilet that has a pedal for controlling the open-closed pulling mechanism.

U.S. Pat. Nos. 6,931,684 and 7,080,418, issued Aug. 23, 2005 and Jul. 25, 2006 respectively, for a bed or wheelchair having an integral refuse disposal system, each invented by Henegar, describe a refuse disposal systems comprising: a seat member; an annular well holding an annular cartridge of compressed disposable tubing positioned within the annular well; and disposable tubing extending upwardly from the cartridge over the seat member and downwardly through the seat's opening. After use, the fresh tubular material is pulled from the cartridge and the waste is tied off or sealed in the used portion of the tubular material.

U.S. Pat. No. 7,562,400, issued on Jul. 21, 2009, invented by Graham, for mobile equipment for non-ambulatory people, describes a commode adapted to assist non-ambulatory person to independently access said commode, the commode comprising: a dispenser of tubes adapted to provide a tube within a basin to receive and enclose the waste products; a lower baffle that is capable of clamping an open top of the tube after receiving the waste products; and a cutting tool to cut individual bags from the tube.

U.S. Pat. No. 7,849,527, issued on Dec. 14, 2010, invented by Nochizuki et al., for a toilet apparatus with processing material, describes a toilet apparatus comprising: a packaging member comprising a long, flexible and folded continuous cylindrical member set in position surrounding the toilet bowl and below the toilet seat, the packaging member being adapted to receive excrement produced by the user and subsequently sealed at an opening thereof and transferred downward in the toilet bowl; processing material for absorbing liquid and semi-solidifying the excrement; a mechanism to feed processing material into the packaging member alongside the excrement; and a sensor to automatically supply the processing material into the bowl when the user sits on the toilet seat or stands up from the toilet seat.

US Pub. No. 20090255045, published Oct. 15, 2009, invented by Sakurai, for excretion packaging type portable toilet apparatus, describes an excretion packaging portable toilet adapted for: packing excretion produced at a time into a flexible bag-like container; hermetically sealing the pack; and dropping the pack into a storage section under the main toilet body.

PCT Pub. No. WO2009129638, published Oct. 29, 2009, invented by Luscher et al., for a water-free toilet system, describes a toilet device comprising: a toilet seat; a film tube for collection of waste; a closing device below the toilet seat for using a shutter to close a bag from the film tube at certain intervals; and a conveyor system for moving closed bags to a collection container.

PCT Pub. No. WO2011113164, published Sep. 22, 2011, invented by Luscher et al., for a waterless toilet system, describes a toilet device comprising: a seat; a film tube under the seat, provided for receiving products of human excretion and closed on one end; means for closing the film tube to form a closed bag; and means for detaching the closed bag to produce once again a film tube that is closed at one end. This publication further describes a catching device for receiving detached closed bags.

SUMMARY OF THE INVENTION

The present invention relates to portable sanitation. It is an object of this invention in systems and apparatus embodiments to provide an environmentally-friendly portable toilet that is waterless, odorless and cost efficient, that uses specially-lined or chemical-dosed bags from a continuous bag supply that kill pathogens in waste, and are sealed and released downwardly into a base section, the base section being connected to a hard plastic sitting unit, forming an integral, closed system for waterless sanitation. Yet another object of this invention is to provide methods for using the waterless, odorless toilet device and/or system of the present invention.

In aspects of the systems, methods, and apparatus embodiments of the present invention, an environmentally-friendly portable toilet is provided that is waterless, odorless and cost efficient, that uses a continuous bag supply having a predetermined single dose or portion of at least one chemical automatically deposited therein, the at least one chemical functional to kill pathogens in waste that is deposited through an opening in the seat and a corresponding opening of the continuous bag supply; the waste-filled continuous bag supply is at least temporarily sealed by activation of a mechanical sealing mechanism, and released downwardly into a base section, which is connected to a hard plastic sitting unit, forming an integral, closed system for waterless sanitation.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 15 is a side cross sectional view of the chemical agent dispenser illustrated in FIG. 13 and FIG. 14.

FIG. 25A shows a top perspective view of components of the present invention.

FIG. 25B shows a side view of components of the present invention.

FIG. 25C shows a bottom perspective view of components of the present invention.

FIG. 25D shows a bottom view of components of the present invention.

FIG. 25E shows an end view of components of the present invention.

FIG. 25F shows a top view of components of the present invention.

DETAILED DESCRIPTION

Figure 1:
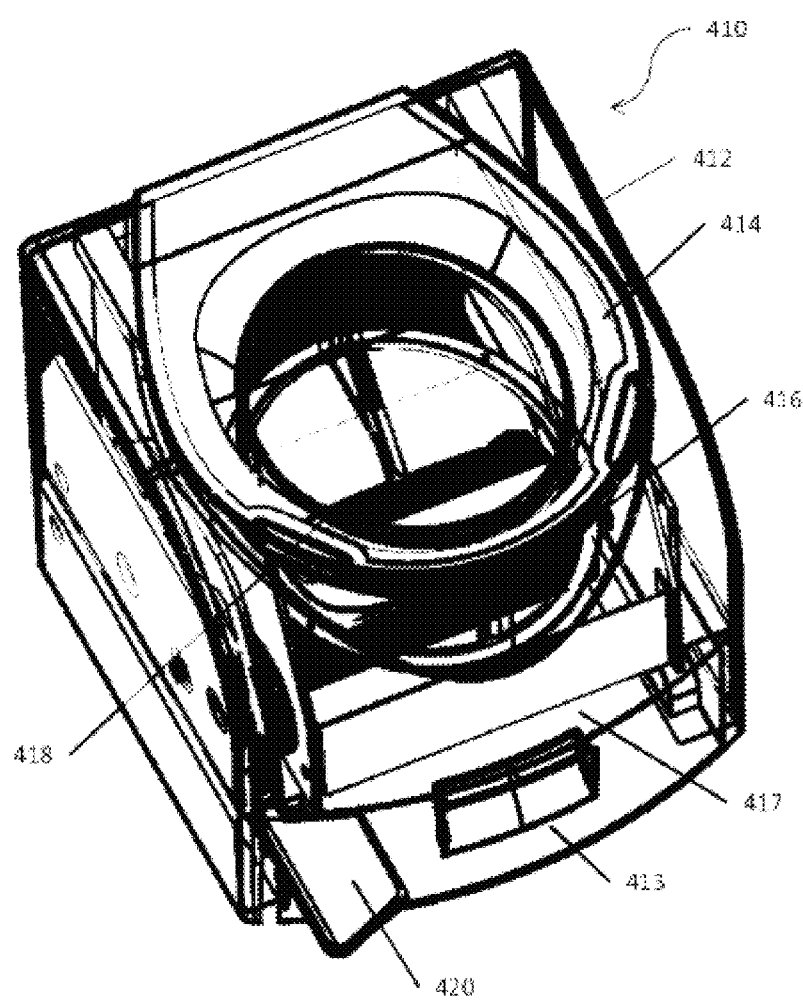
FIG. 1 is a perspective view diagram illustrating an embodiment of the present invention.

Referring now to the drawings in general, the illustrations are for the purpose of describing a preferred embodiment of the invention and are not intended to limit the invention thereto.

The systems, methods, and apparatus embodiments of the present invention provide an environmentally-friendly portable toilet that is waterless, odorless and cost efficient, that uses a continuous bag supply having a predetermined single dose or portion of at least one chemical automatically deposited therein, the at least one chemical functional to kill pathogens in waste that is deposited through an opening in the seat and a corresponding opening of the continuous bag supply; the waste-filled continuous bag supply is at least temporarily sealed by activation of a mechanical sealing mechanism, and released downwardly into a base section, which is connected to a hard plastic sitting unit, forming an integral, closed system for waterless sanitation.

The present invention provides systems and methods for waterless sanitation, including an environmentally-friendly portable toilet that is waterless, odorless and cost efficient, that uses specially-lined and/or fillable continuous bag supply portions that receive at least one chemical for neutralizing and/or killing pathogens, and are sealed and released into a base section, which is connected to a hard plastic sitting unit, forming an integral, closed system for waterless sanitation.

In one embodiment of the present invention, a waterless sanitation system is provided that includes a base section enclosing a continuous bag supply and/or continuous tube of waste-containment material for receiving waste through an opening in a sitting unit, connected to and positioned above the base section.

As shown in the figures, various views are provided of one embodiment of the invention, namely the apparatus and its components including a sitting unit or seat member, attached to a base unit, wherein the base unit further includes and houses waste receiving bags and/or a continuous supply of bags and/or a continuous tube of waste containment material, and the base unit is further attached to a storage bin 30, all of which are retrofittable to existing portable toilets and/or bathrooms, including but not limited to bathrooms in boats, RVs, mobile homes, etc., while no longer requiring a pit or hole for receiving waste from users, and eliminating the odor associated with waterless toilets.

An apparatus for waterless, odorless waste receiving and disposal according to the present invention includes a portable toilet that is waterless, odorless and cost efficient, and that uses a continuous bag supply having a predetermined single dose or portion of at least one chemical automatically deposited therein, the at least one chemical functional to kill pathogens in waste that is deposited through a seat opening in the seat and a corresponding opening of the continuous bag supply; the waste-filled continuous bag supply is at least temporarily sealed by activation of a mechanical sealing mechanism, and released downwardly into a base section, which is connected to a hard plastic sitting unit, forming an integral, closed system for waterless sanitation. Preferably, the at least one chemical is an anti-microbial material for decontaminating waste, and wherein the waste-filled continuous bag supply is biodegradable, environmentally-friendly, and/or non-toxic and the at least one chemical includes an anti-microbial agent. In one embodiment, the plastic material is an engineered plastic containing PVDC and having multiple layers that is non-toxic.

In embodiments for a system for providing waterless sanitation, a waterless toilet is provided for use within a portable toilet enclosure constructed and configured with a closable door entry and sides shaped to receive a person along with the waterless toilet, which further includes a housing enclosing a top seating unit matingly connected to a bottom receiving container, the top seating unit enclosing a continuous plastic bag supply constructed and configured to feed into a mechanical sealing mechanism formed by two aligned rollers that form a nip line when activated into a closed position; wherein the mechanical sealing mechanism is operable for temporarily sealing a waste-filled portion of the continuous plastic bag supply to form a sealed bag, and advancing the sealed bag into the bottom receiving container, thereby providing a sanitary, waterless waste disposal system.

The system includes a spring-loaded foot pedal to activate the mechanical sealing mechanism, and to advance the waste-filled portion and sealed bag portion of the continuous bag supply to create a faux-flushing action. The mechanical sealing mechanism further includes four interactive gears connected by spaced-apart, aligned rollers that are activatable by the mechanical sealing mechanism to form a nip line to cinch and to seal the continuous bag supply to form sealed waste-filled bags when activated. The top seating unit includes a lid pivotally connected to a seat, wherein the seat includes a seat opening for waste to be deposited into the continuous bag supply. And preferably, the lid and the seat pivot motion activates the depositing of a predetermined amount of a chemical into the continuous bag supply opening. In preferred embodiments, the top seating unit and the bottom receiving container, and the housing are formed of a rigid plastic material suitable for supporting the weight of a person up to at least about 300 and up to about 400 lbs. without deflecting, cracking, bending, or breaking. The continuous bag supply (not shown) includes a bag opening that corresponds with and/or aligns with a top seating unit opening to allow waste to be deposited through the top seating unit opening into the continuous bag supply opening.

In methods of the present invention for providing waterless sanitation, the following steps are included: providing a waterless toilet system comprising a top seating unit matingly connected to a bottom receiving container, the top seating unit further comprising a continuous plastic bag supply that feeds into a mechanical sealing mechanism; advancing the continuous plastic bag supply through the mechanical sealing mechanism; activating the mechanical sealing mechanism to create a seal a first end of the plastic bag supply to form a bag portion, wherein the seal is created by a nip line formed between two aligned rollers; providing a bag opening corresponding to a seat opening to allow receiving of a waste into the bag portion; activating the mechanical sealing mechanism to completely enclose the waste within the continuous plastic bag supply by temporarily sealing a second end, when the nip line is formed between two aligned rollers; advancing the filled portion of the continuous bag supply downwardly into the bottom receiving container; and providing a waterless faux-flushing action by activating the mechanical sealing mechanism and advancing the filled bag portion with a spring-loaded foot pedal.

In one embodiment, the waterless faux-flushing action is provided by activating a foot pedal constructed and configured to connect with mechanical gears that automatically perform the step of advancing the filled portion of the continuous bag supply downwardly.

Preferably, in the apparatus, systems and methods of the present invention, the continuous plastic bag supply further includes an anti-microbial material for decontaminating waste, which may be added by depositing into the continuous bag supply opening and/or predeposited, lined, or otherwise incorporated into the continuous bag supply material and/or inner surface that is exposed to the waste.

Figure 2:
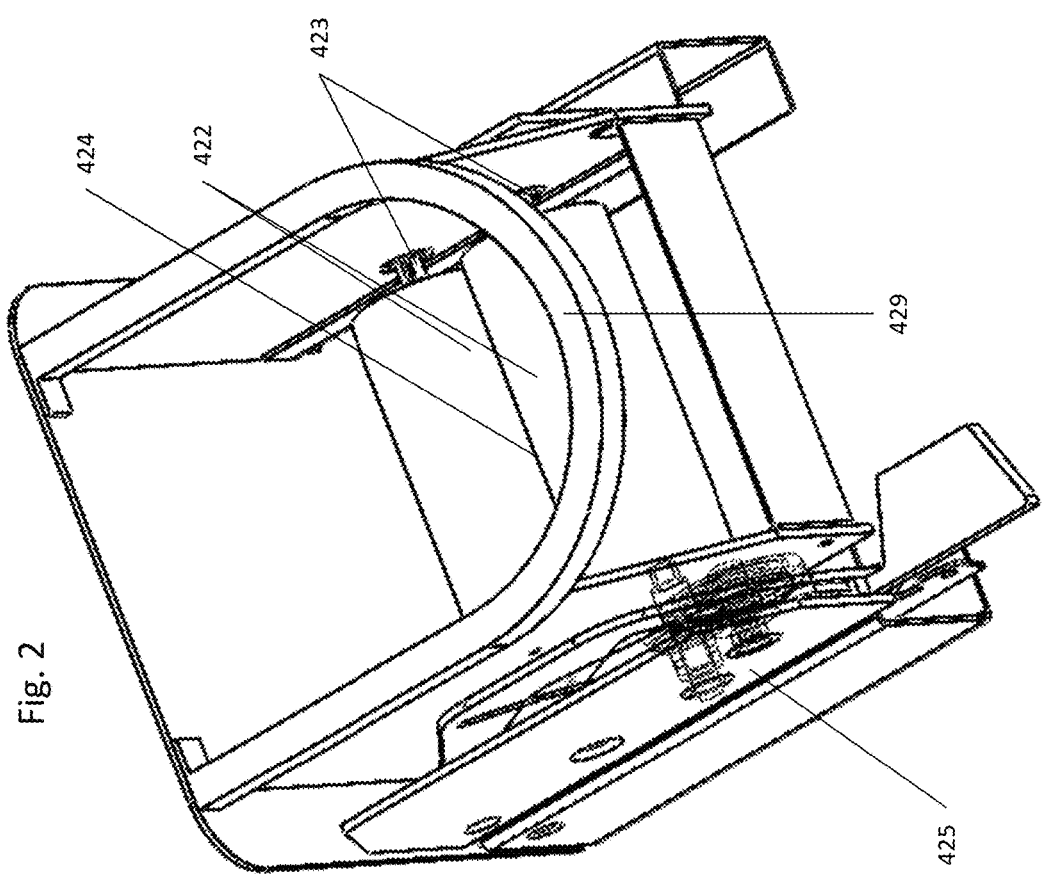
FIG. 2 shows another perspective view diagram illustrating the embodiment of FIG. 1 without the cover, seat, lid, and outer housing components.
Figure 3:
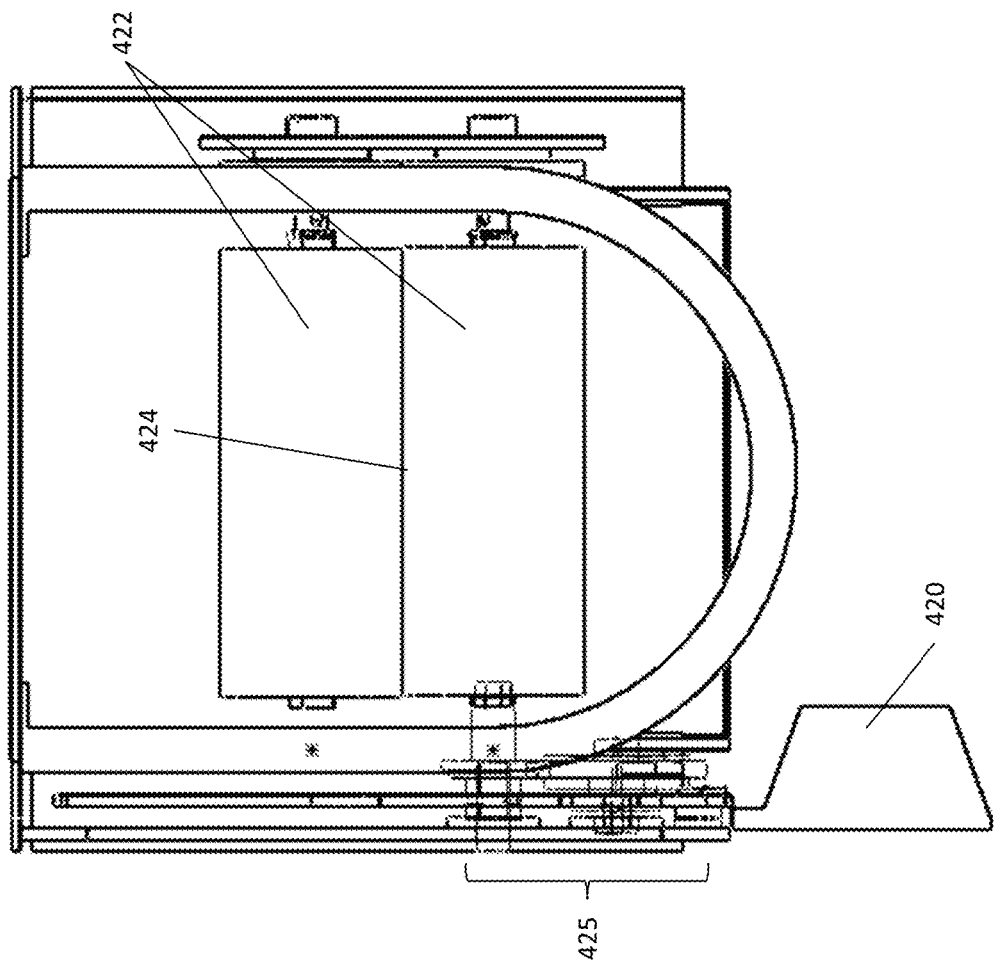
FIG. 3 shows a top view diagram illustrating the embodiment shown in FIG. 2.
Figure 4:
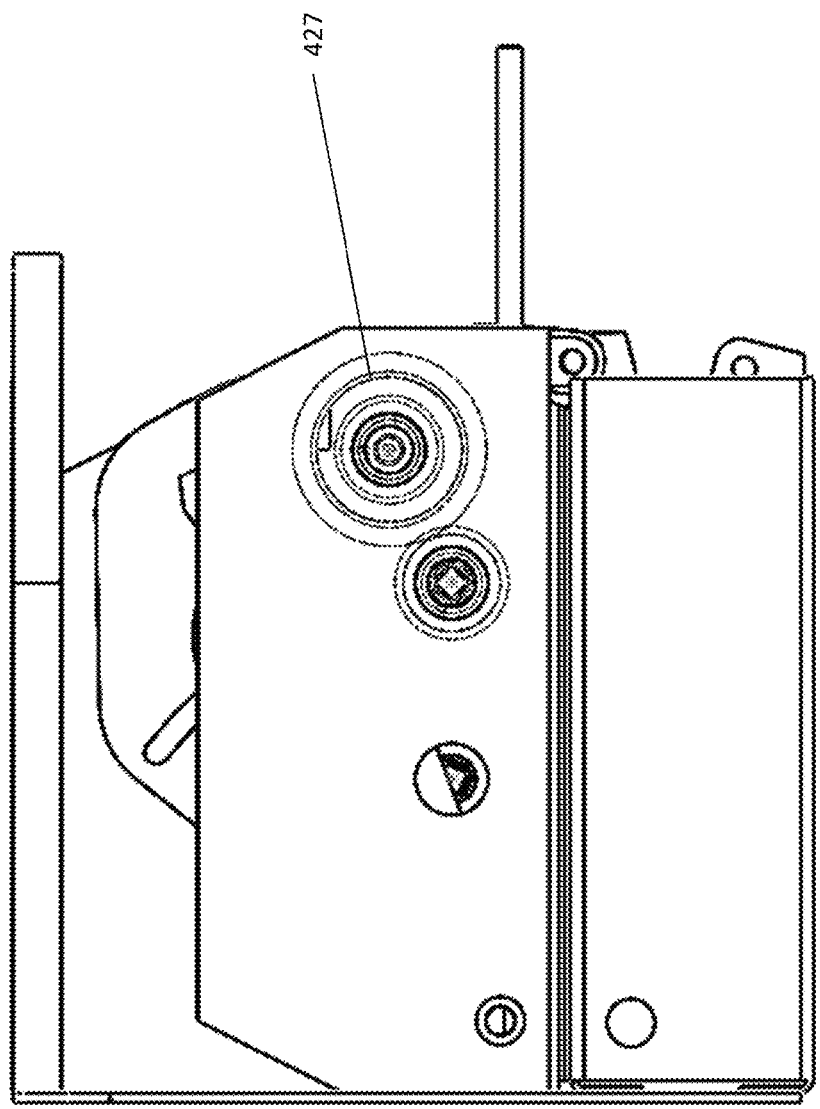
FIG. 4 shows a side view diagram illustrating the embodiment shown in FIG. 2.
Figure 5:
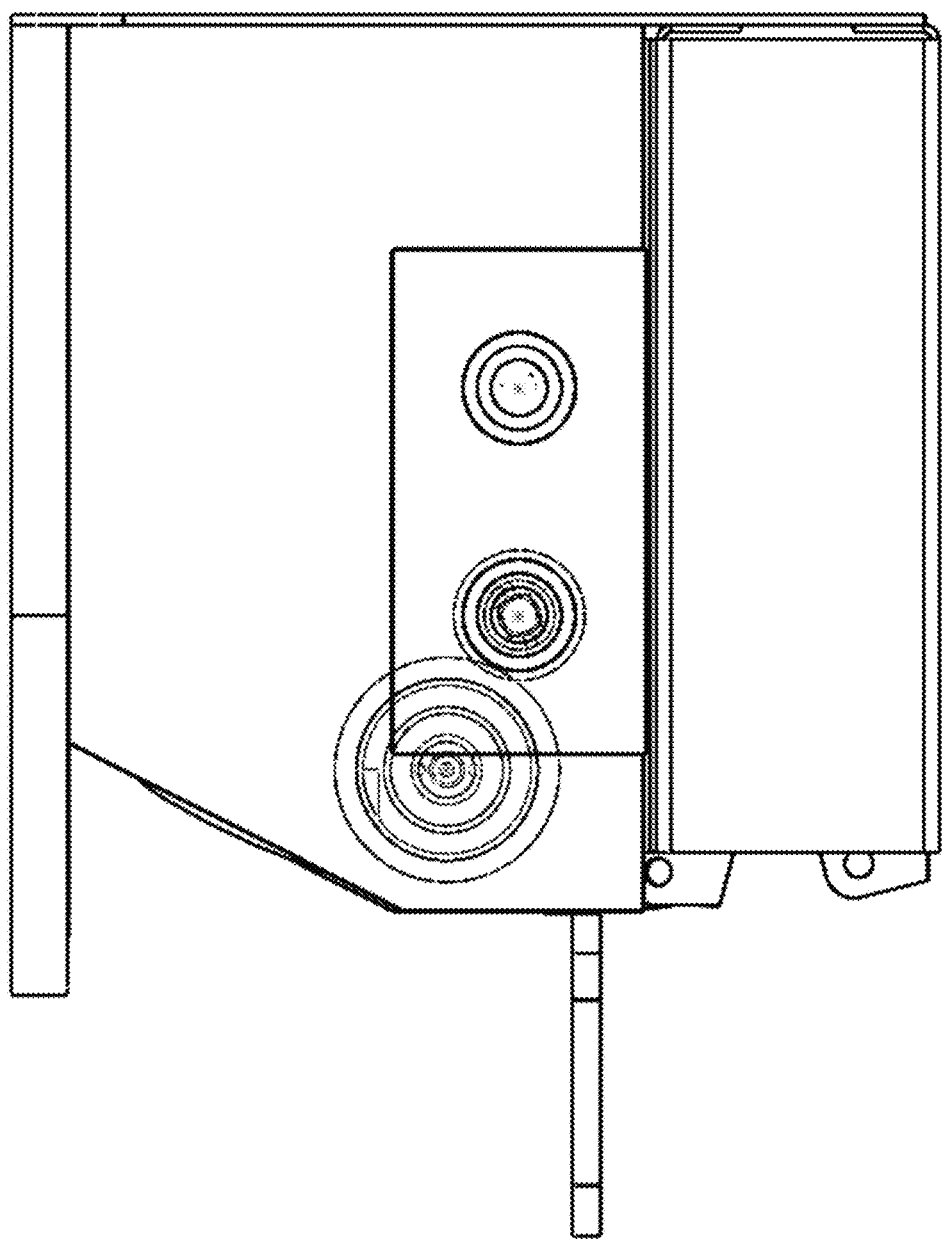
FIG. 5 shows another side view diagram illustrating the embodiment shown in FIG. 2.

Referring now to FIG. 1, a perspective view diagram of one embodiment of the apparatus is illustrated. FIG. 2 shows another perspective view diagram illustrating the embodiment of FIG. 1 without the cover, seat, lid, and outer housing components. FIG. 3 shows a top view diagram illustrating the embodiment shown in FIG. 2. FIG. 4 shows a side view diagram illustrating the embodiment shown in FIG. 2. FIG. 5 shows another side view diagram illustrating the embodiment shown in FIG. 2. FIG. 1, generally referenced 410, includes a housing 412, having a lid 414 that is hingedly connected 415 to a seat 416 further including a seat opening 418 that is generally approximately centrally positioned on the seat, which is illustrated as substantially circular or elliptical. The waterless toilet apparatus further includes a front cover 417, a base 413, and a pedal or foot mechanism 420 for activating a faux-flushing action. FIG. 2 further illustrates internal components including a pair of rollers 422 having horizontally aligned, spaced-apart axles 423 and forming a nip line 424. The pedal 420 for activating faux-flushing mechanism 425 provides for opening and closing of the pair of rollers, i.e., disengaging and forming the nip line, respectively. The rollers rotate toward the nip line to provide a gravity-based downward motion of the continuous bag supply tube (not shown) toward the base, which is illustrated in FIG. 1. Preferably, all connections between and among components of the apparatus and system of the present invention are mechanical action-based mechanisms for activating the faux-flushing action.

Figure 6:
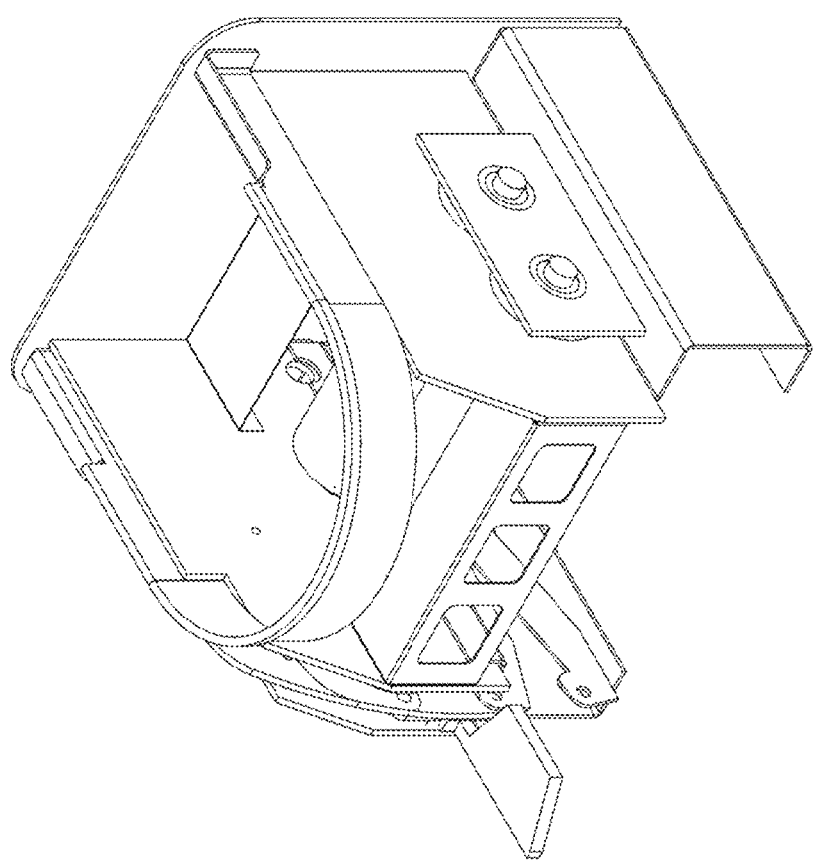
FIG. 6 shows a right perspective view diagram illustrating another embodiment of the present invention.
Figure 8:
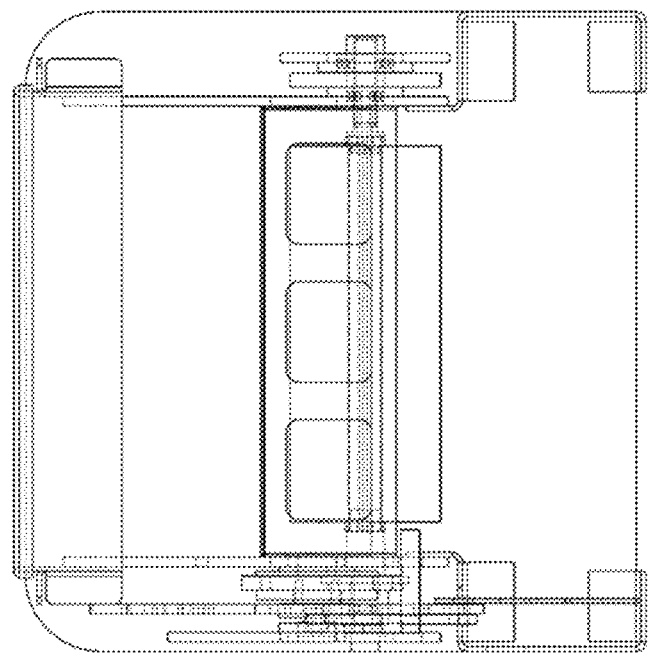
FIG. 8 shows a back view diagram illustrating the embodiment shown in FIG. 6.
Figure 7:
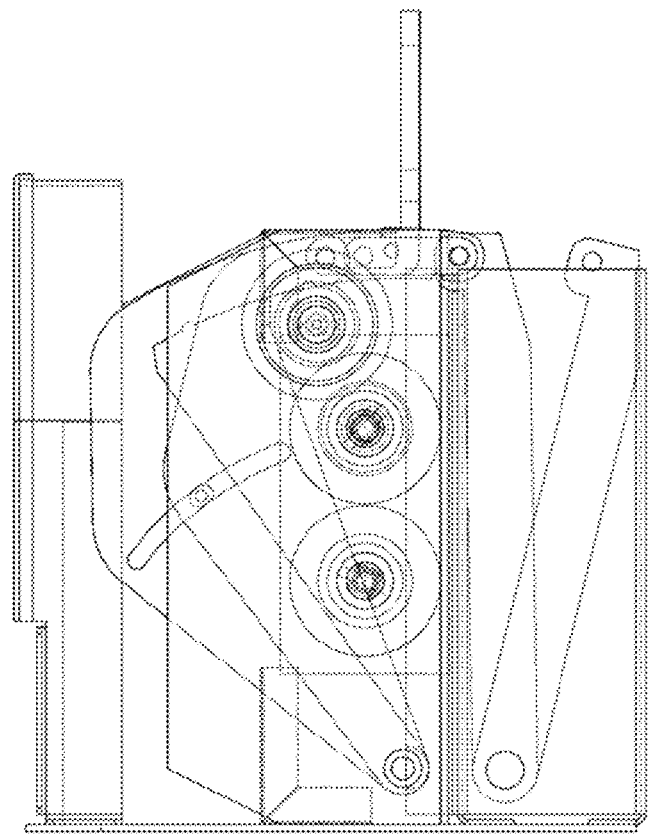
FIG. 7 shows a left side view diagram illustrating the embodiment shown in FIG. 6.
Figure 10:
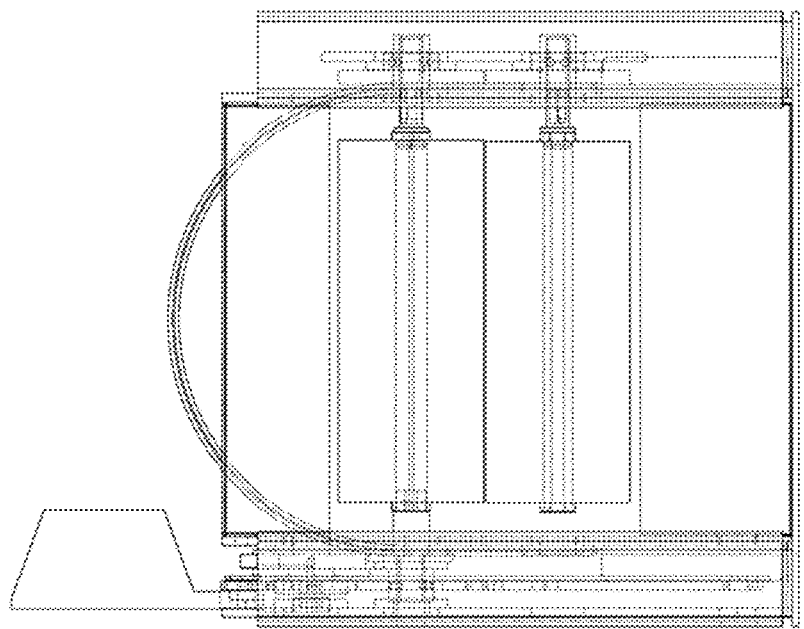
FIG. 10 shows a bottom view diagram illustrating the embodiment shown in FIG. 6.
Figure 9:
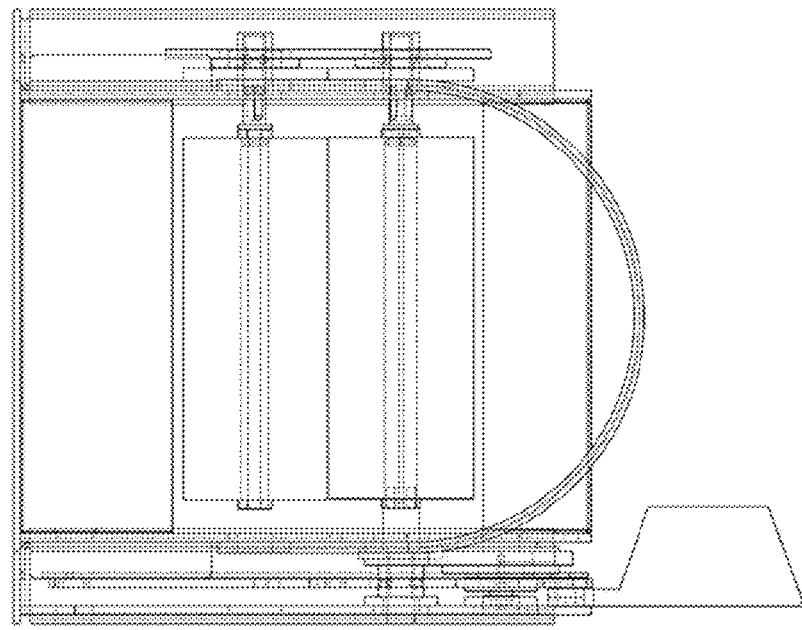
FIG. 9 shows a top view diagram illustrating the embodiment shown in FIG. 6.

FIG. 6 shows a right perspective view diagram illustrating another embodiment of the present invention. FIG. 7 shows a left side view diagram illustrating the embodiment shown in FIG. 6; as illustrated, the continuous plastic bag supply 427 (FIG. 4) is positioned forward and slightly above the nipped rollers 422 and feeds over the seat base 429 to provide a receiving opening for the waste to be downwardly deposited therein. FIG. 8 shows a back view diagram illustrating the embodiment shown in FIG. 6. FIG. 9 shows a top view diagram illustrating the embodiment shown in FIG. 6. FIG. 10 shows a bottom view diagram illustrating the embodiment shown in FIG. 6.

Figure 11:
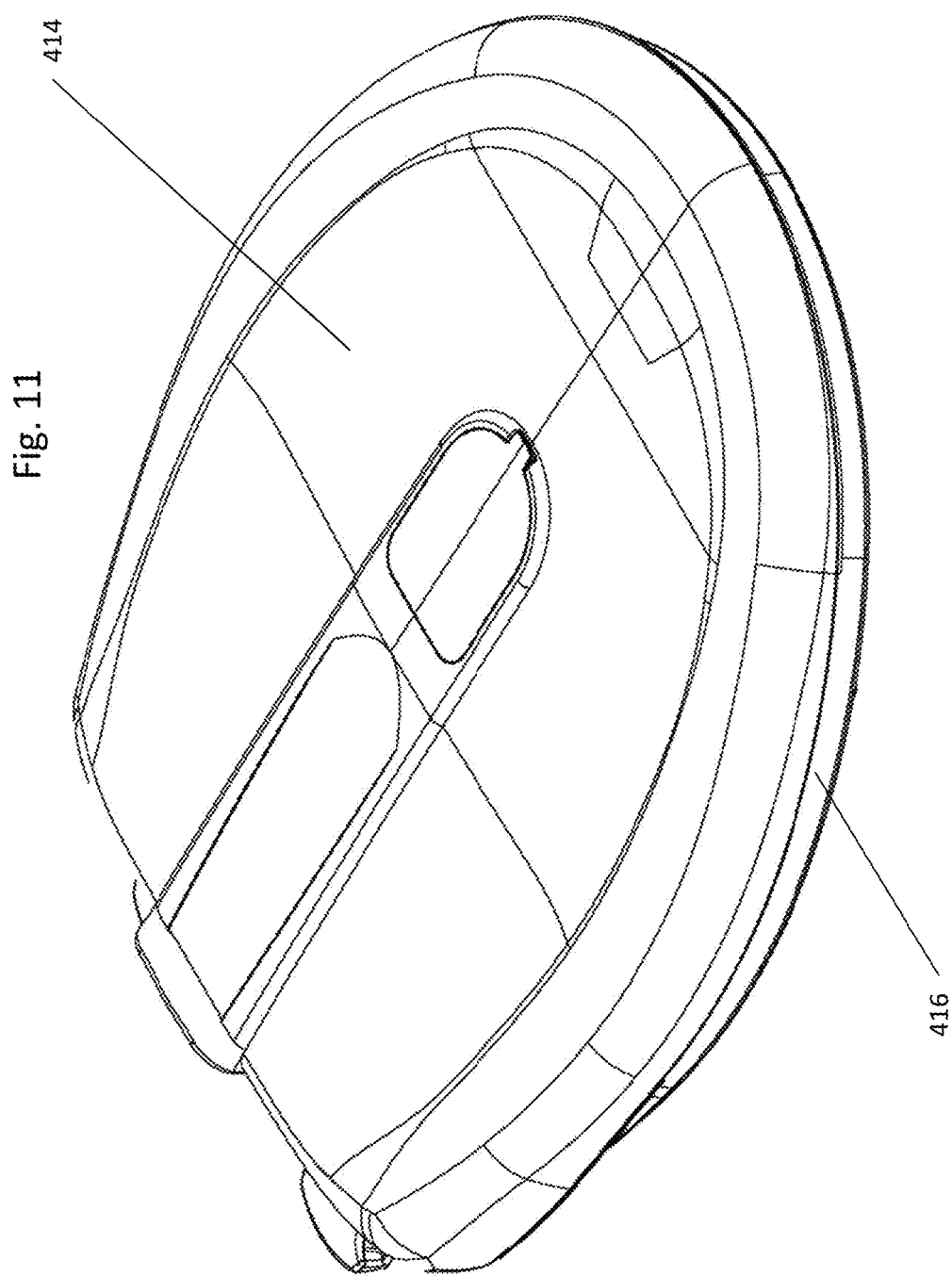
FIG. 11 shows a perspective view diagram illustrating a seat and lid component in a closed position according to an embodiment of the invention, as in FIG. 1.
Figure 12:
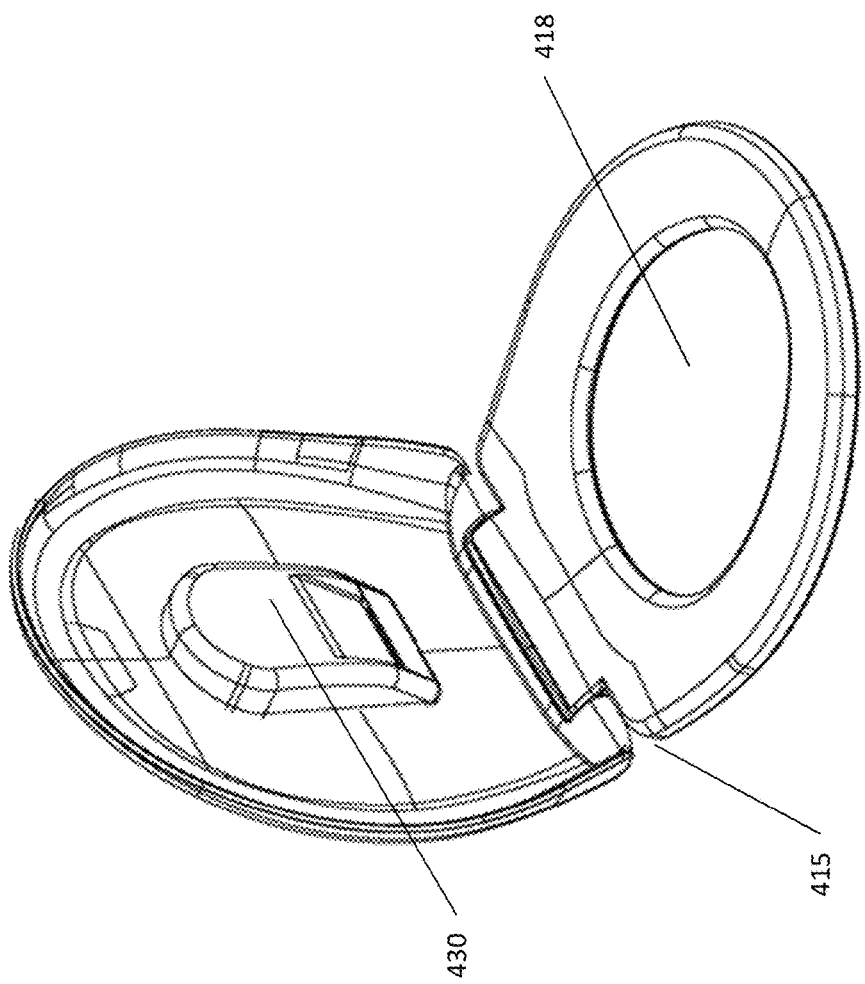
FIG. 12 shows another perspective view diagram illustrating the seat and lid component of FIG. 11 in an open position.

FIG. 11 shows a perspective view diagram illustrating a seat and lid component in a closed position according to an embodiment of the invention, as in FIG. 1. FIG. 12 shows another perspective view diagram illustrating the seat and lid component of FIG. 11 in an open position with a chemical agent dispenser attached to the lid underside.

Figure 13:
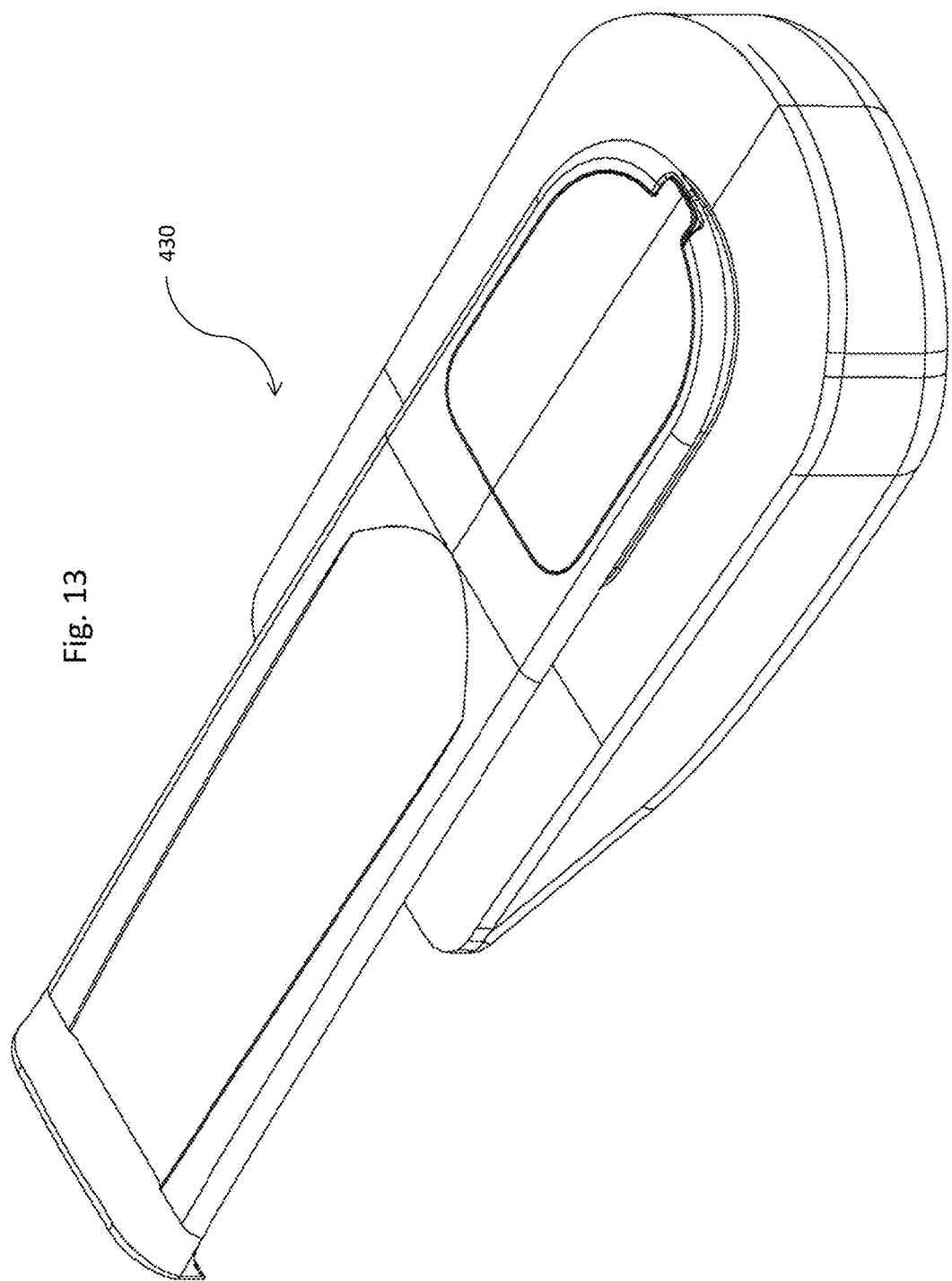
FIG. 13 is a perspective view of the back side of a chemical agent dispenser attachable to the lid illustrated in FIG. 11.
Figure 14:
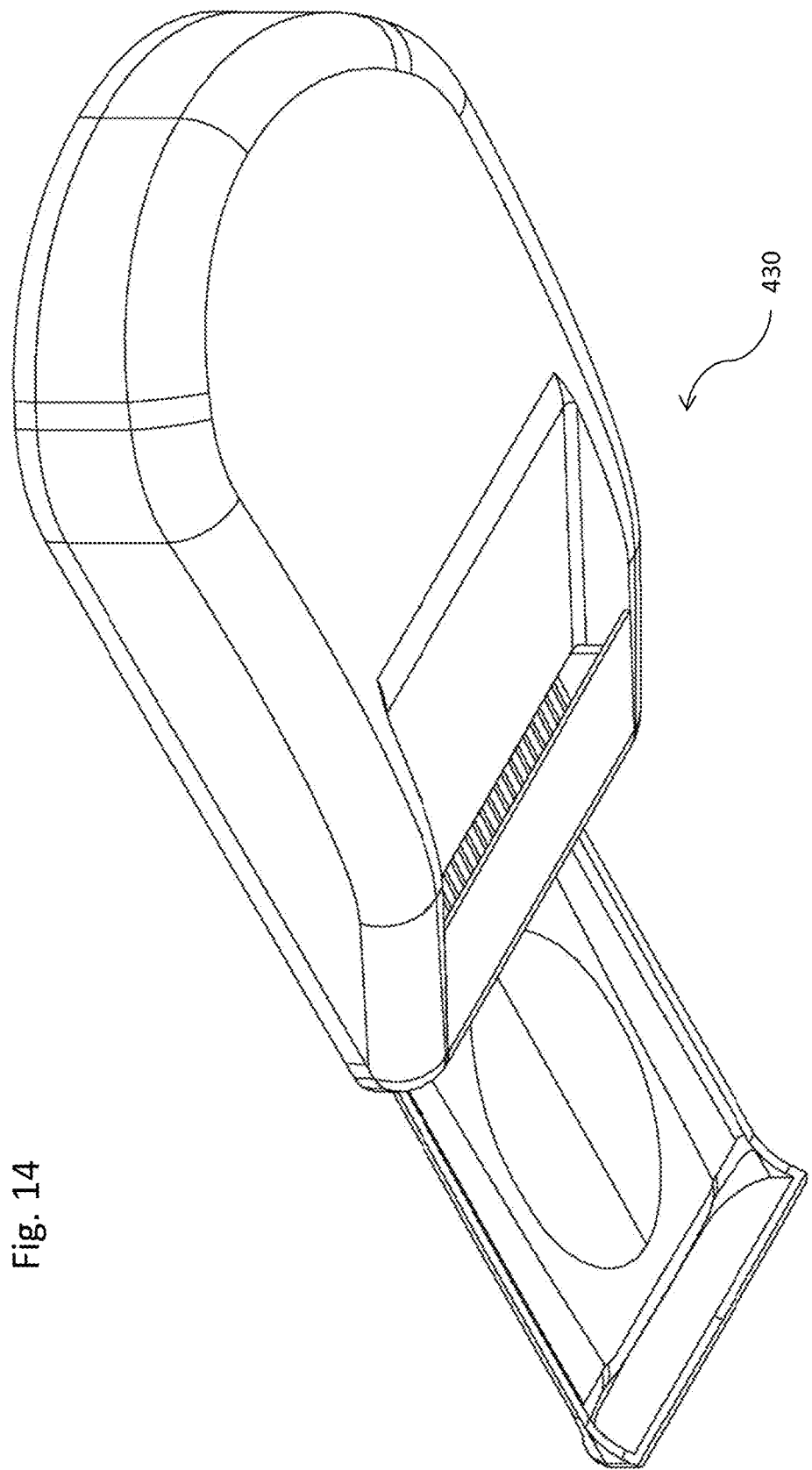
FIG. 14 is a perspective view of the front side of a chemical agent dispenser of FIG. 13 attachable to the lid illustrated in FIG. 11.
Figure 16:
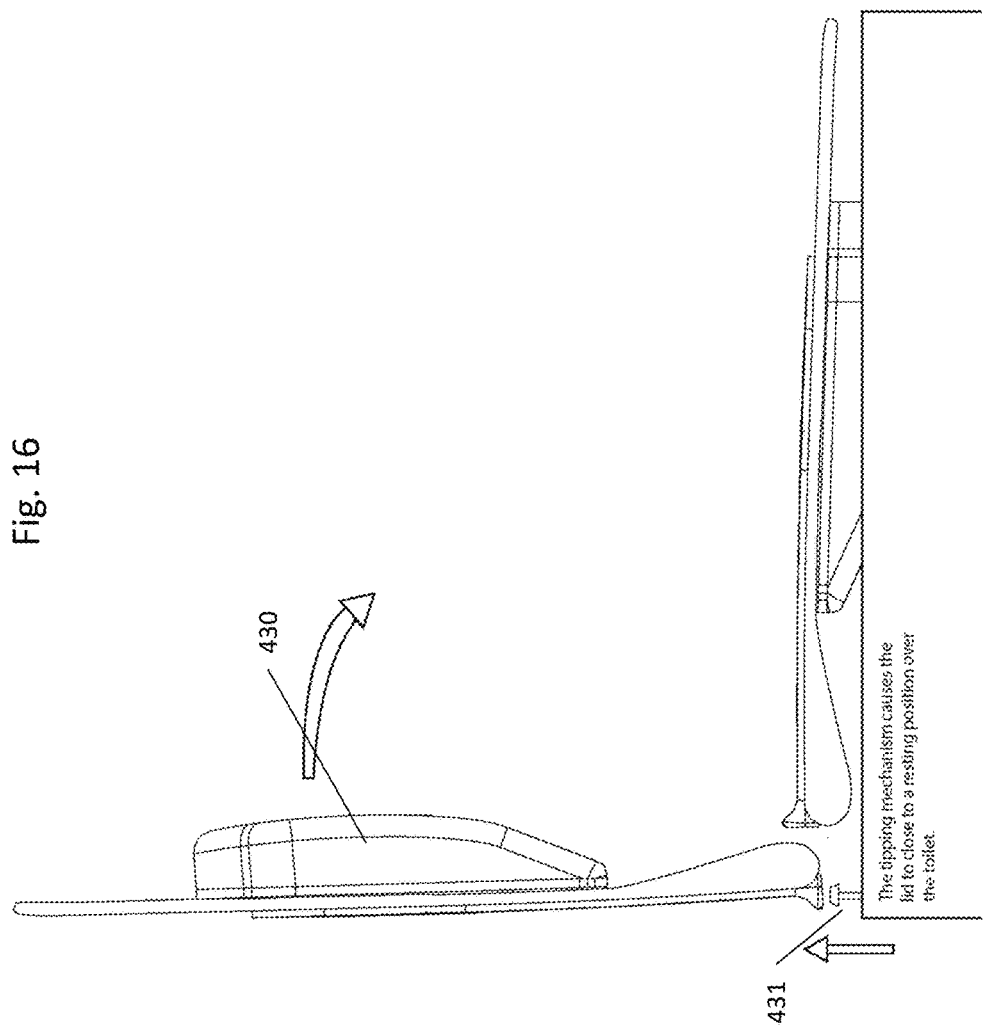
FIG. 16 shows a side view of the chemical agent dispenser illustrated in FIGS. 13-15 attached to a lid and seat in an open position.
Figure 17:
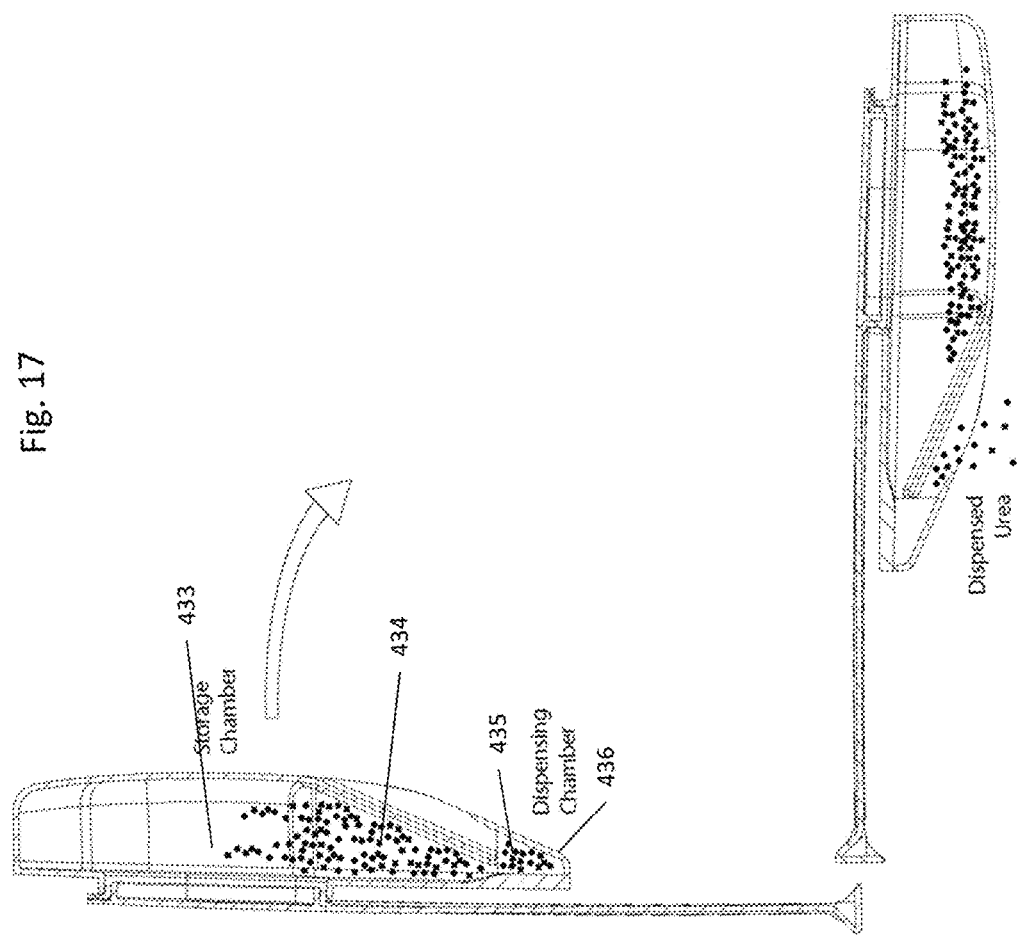
FIG. 17 shows a cross sectional side view of the chemical agent dispenser illustrated in FIGS. 13-15 attached to a lid and seat in an open position.

FIG. 13 is a perspective view of the back side of a chemical agent dispenser attachable to the lid illustrated in FIG. 11. FIG. 14 is a perspective view of the front side of a chemical agent dispenser of FIG. 13 attachable to the lid illustrated in FIG. 11. FIG. 15 is a side cross sectional view of the chemical agent dispenser illustrated in FIG. 13 and FIG. 14. FIG. 16 shows a side view of the chemical agent dispenser 430 illustrated in FIGS. 13-15 attached to a lid and seat in an open position, and further including a plunger or a tipping mechanism 431 that is activated to cause the lid to automatically close in a controlled, smooth manner (without slamming down by unrestricted gravity) into a resting position over the toilet when the flushing mechanism is activated. FIG. 17 shows a cross sectional side view of the chemical agent dispenser illustrated in FIGS. 13-15 attached to a lid and seat in an open position. FIG. 17 shows at least one chemical agent 434 in a storage chamber 433 of the chemical agent dispenser with a single dose amount 435 in the dispensing chamber 436 for gravity-based dispensing of the single dose amount of the at least one chemical agent when the lid is in a closed position and correspondingly the chemical agent dispenser attached to the inside of the lid is in a substantially horizontal position.

The anti-microbial dispenser is a gravity fed system attached to the lid of the toilet seat. The anti-microbial is filled from the top of the closed lid. When the lid is opened, anti-microbial flows down to the bottom of the container, which is measured to hold 6 grams of the anti microbial. When "flushed" in the faux-flushing activation, a plunger or a tipping mechanism, for example as described in the foregoing, pushes the lid closed. The toilet seat and lid hinged closing mechanism preferably provides a slow close toilet seat, i.e., that gently closes without banging harshly or that is restrained from a merely gravity-based closing around the hinge. As the toilet lid closes, the pre-calculated amount or dose of the at least one chemical agent or anti-microbial flows or falls out into the bag portion exposed for receiving the waste deposited from the next usage of the waterless toilet apparatus. When the next user, lifts the toilet lid to the use the toilet, the at least one chemical agent, such as an anti-microbial, is automatically refilled within the dispenser chamber for the predetermined dose amount.

Figure 18:
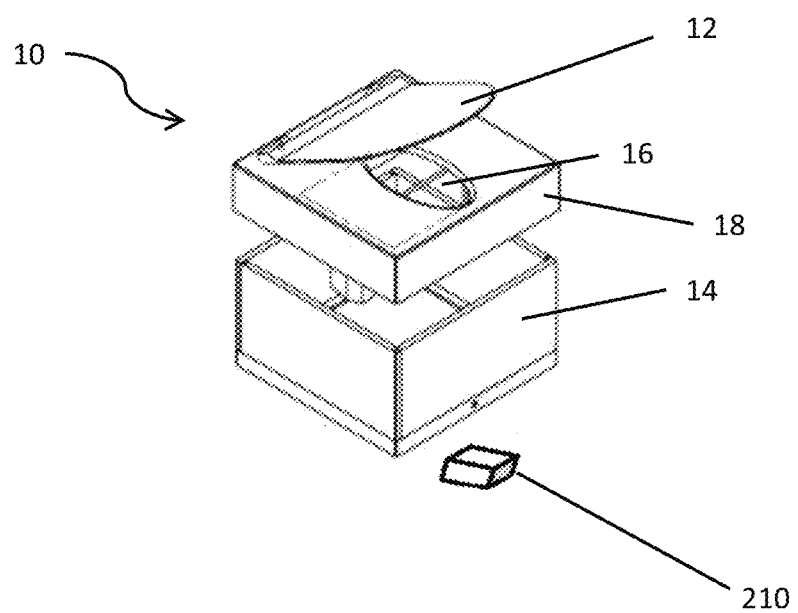
FIG. 18 is a perspective view diagram showing exploded views of the main components of one embodiment of the invention.
Figure 19:
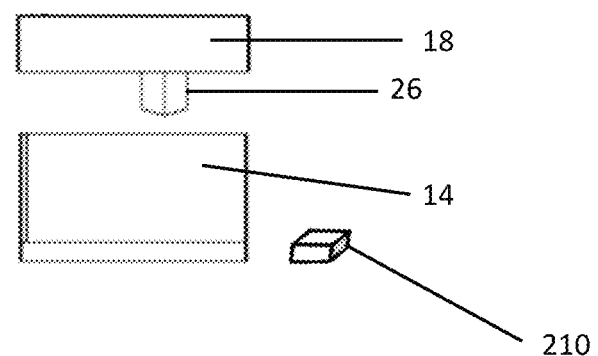
FIG. 19 is a side view diagram of the invention of FIG. 18, showing the lid in an open position and the base unit separated from the seating unit.
Figure 20:
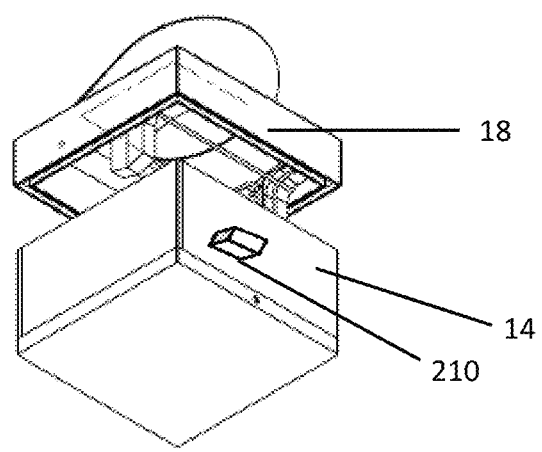
FIG. 20 is a perspective view diagram from a lower view showing exploded views of the main components of one embodiment of the invention shown in FIG. 18.
Figure 21:
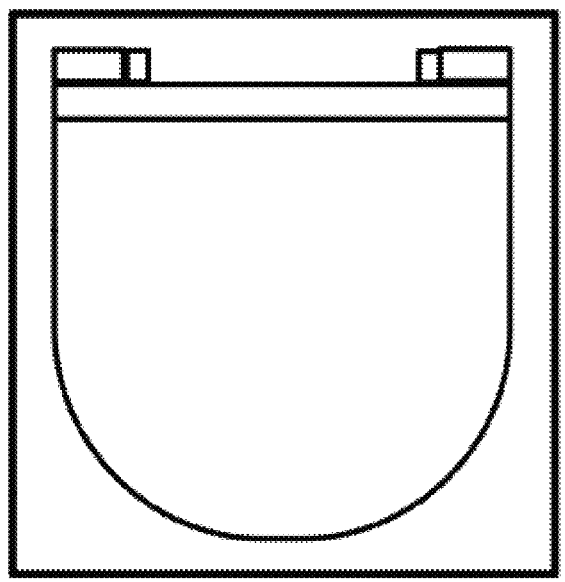
FIG. 21 is a top view diagram of the invention of FIG. 18.
Figure 22:
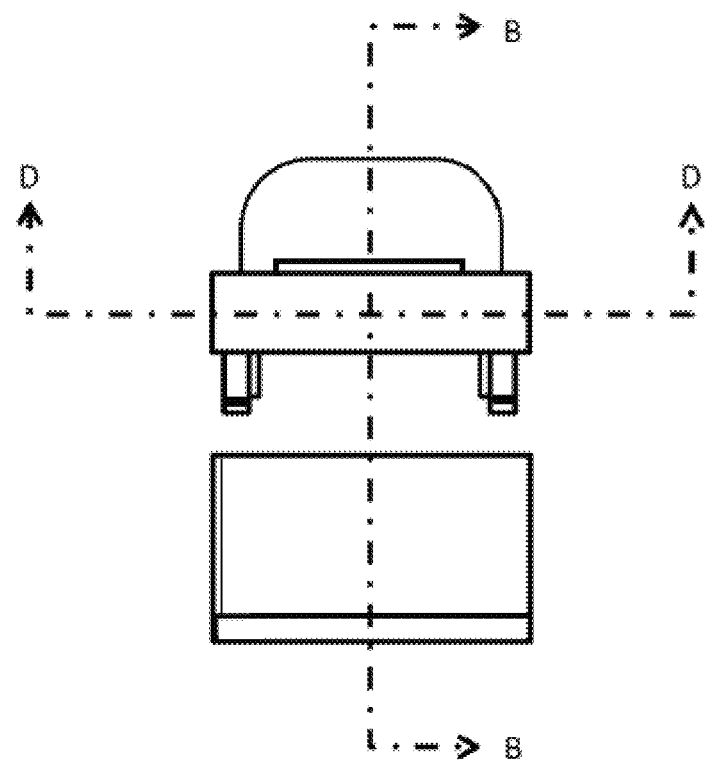
FIG. 22 is a front view diagram of the invention of FIG. 18.
Figure 23:
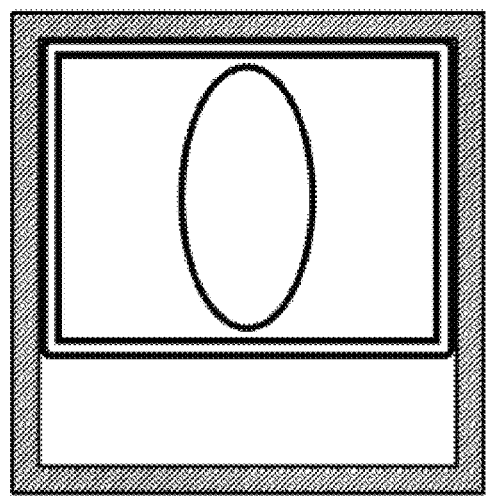
FIG. 23 is a bottom sectional view diagram of FIG. 18 along line D-D.
Figure 24:
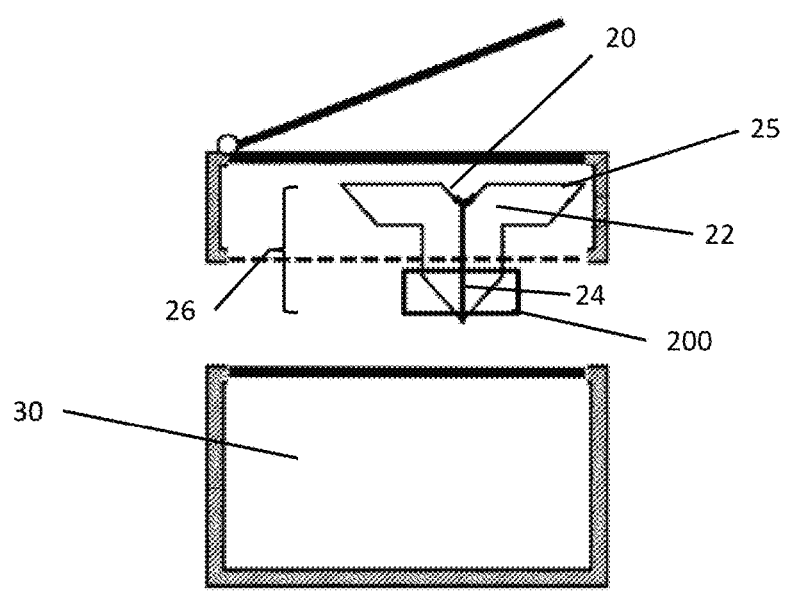
FIG. 24 is a side sectional view diagram of the invention of FIG. 18 along line D-D.
Figure 25A:
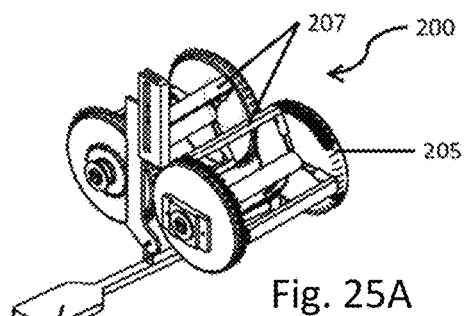
FIGS. 25A-25F generally illustrate a series of views of components of the present invention.
Figure 25F:
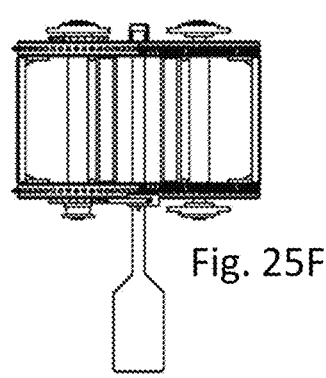
Figure 25E:
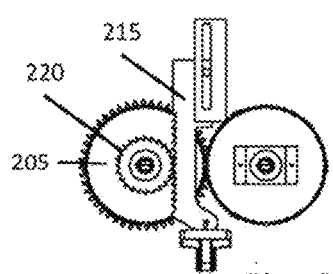
Figure 25B:
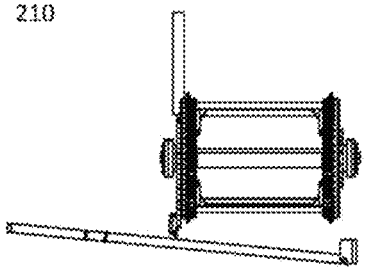
Figure 25D:
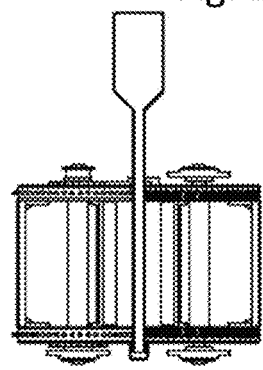
Figure 25C:
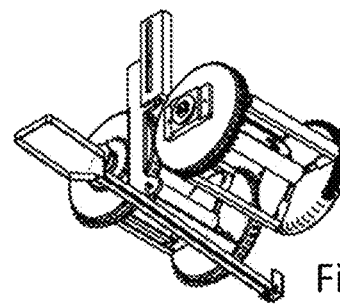

More specifically, FIG. 18 is a perspective view diagram showing exploded views of the main components of one embodiment of the invention. FIG. 19 is a side view diagram of the invention of FIG. 18, showing the lid in an open position and the base unit separated from the seating unit. FIG. 20 is a perspective view diagram from a lower view showing exploded views of the main components of one embodiment of the invention shown in FIG. 18. FIG. 21 is a top view diagram of the invention of FIG. 18. FIG. 22 is a front view diagram of the invention of FIG. 18. FIG. 23 is a bottom sectional view diagram of FIG. 18 along line D-D. FIG. 24 is a side sectional view diagram of the invention of FIG. 18 along line D-D.

The system is a closed-looped system to collect excreta through a toilet seat and base apparatus that is retrofittable for existing portable toilets (port-a-potties), boat toilets/ bathrooms, campers, RVs, etc. By way of example and not limitation, the system may be used as a stand-alone unit for an alternative toilet for the transportation industry, may have application in mobile home trailers, campers, boats, and the like, or may have application for use in developing countries where plumbing systems are not available or water supplies are limited.

In a preferred embodiment, the system includes a sitting unit or seat member that is attached to a base unit, wherein the base unit further includes and houses waste receiving bags, and the base unit is further attached to a storage bin. In preferred embodiments, the sitting unit is formed of hard plastic and is pivotally connected to the base unit. In an alternative embodiment, the bags may be specially lined bags that include chemicals or enzymes that help to treat the excreta; however, in the preferred embodiments of the present invention, at least one chemical agent (or enzyme) is provided via an automated dosage depositing into the open bag portion as described hereinabove and illustrated in the figures. A sealing mechanism, either temporary sealing to block odors and/or permanent sealing, is used to close and seal the bag after it is full of excreta, before a release mechanism functions to release and/or drop it into the storage bin, thus limiting smell and making it easy to empty. The hard plastic sitting unit has two main components: a bottom holding tank; and a top unit that contains a sealing mechanism. The bottom holding tank fits together using male and female pieces to form a cube for holding the bags. The holding tank is lined with a recycled content material, a biodegradable garbage bag, or similar containment material, to allow for containment of the filled bags and for easy closure and emptying. In a method for using the invention, the bags are then collected or removed from the holding tank. Preferably, the waste output is turned into bio-gas using gasification or fertilizer using composting.

As illustrated in the drawings, particularly FIGS. 18-24, the top unit, generally described as 10, includes a lid 12 that functions like a standard toilet lid, moveable between an open and a closed position, such as by a pivoting movement with a front portion of the lid liftable away from the base unit 14. The lid is preferably closed when the toilet is not in use to help prevent odor rising upwardly through the opening 16 in the sitting unit or seat 18. The bags 20 are provided from a bag tube 22 that supplies a multiplicity of bags to the apparatus; the bag tube has a first end 24 that is inserted into the top of the top unit. In one embodiment illustrated by the sections B-B and D-D in the FIGS. 18-24, the sealing mechanism uses three sealing bars 207 on each pair of gears 205 to cinch the bags and push them through to the holding tank. The sealing mechanism is activated by a foot pedal 210 that extends outwardly from the bottom holding tank. In an alternative embodiment, the foot pedal may be attached to four nylon strings that connect or hook to the sealing mechanism. These strings are disconnectable for emptying the bottom holding tank. The strings are attached to pulleys on either side in the bottom holding tank to activate the sealing mechanism. However, in preferred embodiments of the present invention as described herein, gear mechanisms for attaching the foot pedal to the sealing mechanism as illustrated in the figures, are provided. In another alternative example, plastic rods and elastic bands can be used as the attachment and return mechanism. The holding tank is embodied as a drawer that slides or pulls out from the base as illustrated in the FIGS. 1-17.

In a preferred embodiment, the present invention provides a closed-loop system for waterless human waste receiving, decontamination, and disposal. The system includes a hard plastic sitting unit having two parts including a bottom holding tank or storage bin or receptacle and a top seat and pivotally connected lid, which is movable between an open and a closed position as illustrated in the FIGS. 18-24. In this alternative embodiment, the top sitting unit further includes a waste receiving bag portioning mechanism 26 that includes a mechanical sealing mechanism and a bag cartridge unit 25, or more preferably, for a continuous tube bag supply for holding and dispensing a series of clean, unused bag portions that are not disconnected at their ends and linked after use and sealing by the mechanical sealing mechanism. While a bag cartridge unit is described herein, it is not the most preferred embodiment for cost and efficiency reasons; this includes a bagging mechanism 26, which includes a bag dispenser, such as a bag cartridge unit 25, and mechanical sealing mechanism, which are illustrated in the drawings of FIGS. 18-24 and FIGS. 25A-25F. The bag cartridge unit 25 is positioned below the seat and contains a continuous, antimicrobial-lined plastic sheet tube 22 that is long enough to form about 100 sealed "bags" after each use of the system. Again, in an alternative embodiment that is not the most preferred, the antimicrobial-lined plastic sheet tube that forms bags includes the antimicrobial(s) as additive to the plastic material. By way of example and not limitation, the antimicrobial additive includes urea, which when in contact with water in the excreta produces ammonia automatically and changes the pH within the bags filled with waste; the ammonia kills pathogens in the excreta to decontaminate the waste.

The mechanical sealing mechanism illustrated in FIGS. 25A-25F, generally described as 200, includes four (4) gears 205 connected by sealing bars 207 that extend across the continuous plastic tube. The bars 207 are operable to cinch the plastic to form bags and to push the plastic through the system downwardly toward the storage container or holding tank, as illustrated in FIGS. 18-24. The mechanical sealing mechanism 200 and its four interactive gears 205, connected by sealing rods 207, interact and cooperate to cinch and to seal the continuous tubing to form sealed waste-filled bags when activated, and rotating to advance the continuous tubing and sealed bags downwardly into the receiving container through a top opening therein. Preferably the sealing bars are disconnectable when the bottom holding tank unit needs to be emptied. The mechanical sealing mechanism requires no electricity to function. In a preferred embodiment, the mechanical sealing mechanism is connected to and activated by a foot pedal 210, which protrudes from the bottom of the receiving storage container or holding tank, to provide a waterless faux-flush downward movement of the waste-containing sealed bag into the receiving storage container or holding tank, which is sized to contain about at least about 30, preferably at least about 50, and optionally at least about 100 waste-filled bags or bag portions in the case of a continuous bag supply tube as described in the foregoing. The foot pedal has a spring-loaded connection to the mechanical sealing mechanism. The pedal is connected to gearing mechanism, preferably a rack and pinion gearing as shown in the figures, including but not limited to FIGS. 25A-25F. The rack or toothed bar 215 turns a pinion or gear 220, which turns the one of the four interactive gears 205. The pinion is designed to freewheel with respect to the interactive gear on the return movement so as not to reverse the direction of the sealed bag. Advantageously, the mechanical sealing mechanism provides that no human handling of or contact with the waste bags is necessary. The receiving storage container or holding tank has an open top for receiving the waste-filled bags and for easy emptying thereof. Preferably, it is lined with a larger lined bag or material as set forth hereinabove that encases the at least about 30 filled bags or bag portions. When emptied, the waste-filled bags may be disposed or burned for energy.

In preferred embodiments, the continuous bag supply are dosed with at least one chemical for killing pathogens in the waste deposited into the bag portions. In preferred embodiments the at least one chemical is dosed in a predetermined amount into each bag portion after the waste is deposited therein and when the lid is moved into a closed position, as illustrated in FIG. 16 and FIG. 17. In an alternative embodiment, the bags may be lined with urea and other anti-microbials that kill the odor and disease-causing pathogens in the waste. At the top of each bag a glue lining allows for easy sealing by the sealing mechanism.

Preferably, the plastic tube would contain enough material to supply a multiplicity of bag portions, for example, the equivalent of at least about 30 to about 100 continuous bag portions (about one foot of continuous bag supply tubing for each bag portion).

In an alternative embodiment, the continuous plastic tube 22, housed within the bag cartridge unit 25, extends outward in each direction, parallel to section D-D (see FIG. 24), then upwards and back inwards so that the tube is positioned below the seat opening 16 and above the sealing mechanism 200. In such a position, the sealing mechanism can engage the plastic tube, advancing it downward and through the cylindrical area of the remaining plastic tube housed within the bag cartridge unit. In an alternative embodiment, the tube is configured so that the plastic tube can be pulled up and around the seat itself to provide a clean space to sit. Upon advancement through the sealing mechanism, which seals the plastic tube into a multiplicity of bags, the bags may remain connected to each other, thereby forming a sausage link as they snake down into the bottom receptacle. In one embodiment, the tube provides adhesive strips (or dots) approximately 8-12 inches apart on the horizontal. In preferred applications, a sealing mechanism applies pressure after use and compresses an adhesive together, thereby sealing the tube into a multiplicity of bags.

In an alternative embodiment, the bags are perforated, so when sealed after use, the used bag drops into the base individually, so that a continuous 'sausage link' is not formed. The weight of the filled used bag provides the force required to pull down the next bag.

Preferably, a single layered bag is used, and also preferably it is a bio-degradable plastic. While in an alternative embodiment it may be lined with Urea and other anti-microbials, in preferred embodiments the plastic tube bag supply is not pre-treated with Urea or other chemical additives, rather the at least one chemical agent, preferably Urea and/or other anti-microbials, is deposited into the continuous plastic bag supply tube via the same opening where the waste is deposited; preferably, the Urea and/or at least one chemical agent is deposited in a predetermined amount, by way of example about 6 grams. See generally FIGS. 17-25F. When used in methods and systems of the present invention, the Urea mixes with the water in the waste, forms ammonia and makes conditions within the bag too basic for pathogens to exist. The anti-microbials act as deodorizers.

In one embodiment, the waterless toilet system of the present invention is made out of plastic, which enables it to be versatile for the different types of households in developing countries that would use it. By way of example and not limitation, suitable plastic materials for forming the continuous plastic tube bag supply are selected from the group consisting of PVDC, polyethylene terephthalate (PET), polyethylene (PE), polypropylene (PP), polyvinyl chloride (PVC), and derivations or combinations thereof. These suitable plastic materials are durable, versatile, easy to manufacture, and cost-effective. Additionally, the use of a hard plastic material for forming the storage container or holding tank is advantageous because it is waterproof and is easy to mold into different shapes to allow for both sitting and squatting. The present invention is preferably a waterless system for receiving and decontaminating urine and solid waste from human excrement. The present invention is operable to receive a very small amount of additional material associated with the human excrement, e.g., small quantities of used toilet paper, leaves, or small amounts of water, i.e., several milliliters instead of liters of water used with water-based flushing toilets. The small quantities of used toilet paper, leaves, and/or small amounts of water used as an anal cleansing method may be disposed of with the excreta and received by the waterless toilet system of the present invention. Additionally, personal waste associated with feminine hygiene, which also requires decontamination as human waste may also be disposed into the system and decontaminated within the active decontamination bags used with the present invention. By way of example and not limitation, feminine hygiene waste may include sanitary napkins, tampons, diapers, bladder control personal products, and other personal hygiene products.

The waterless toilet systems of the present invention may be used in an outhouse or inside a residence, depending on household preference. Importantly, the waste is entirely contained within the bags inside the storage bin or holding tank and does not require a pit, such as with portable toilets of the prior art, or significant land space for plumbing for water-based disposal and treatment of the waste. The present invention is constructed and configured to be impervious to liquids, and thereby to prevent contamination of surfaces within the storage bin or container or holding tank. Preferably, the use of hard plastic or metal for the sitting unit, bag dispensing unit, and storage bin or holding tank, provides for cleaning and disinfection, as needed, in particular for the human contact surfaces.

The present invention may include a method for providing waterless sanitation comprising the step of providing a waterless toilet system including a top seating unit matingly connected to a bottom receiving container, the top seating unit further comprising a bag cartridge with a continuous plastic tube that feeds into a mechanical sealing mechanism, which is preferably formed by opening and closing foamed rollers to form a nip line with the continuous plastic tube between the nip line when the rollers are in a closed or sealed position. The method may further include the steps of: advancing the continuous plastic tube downwardly; activating the mechanical sealing mechanism to temporarily seal a first end of the continuous plastic tube to form a bag portion from the continuous plastic tube without creating individual plastic bags that separate from each other, wherein the bag portion is formed from the opening of the bag tube supply that corresponds to the seat opening, and a closed end or tip end of the continuous bag supply tubing, which is gravity deposed downwardly into the base; filling the bag portion with waste (the filled bag portion allocated up to about one foot of the continuous plastic tubing per usage); activating the mechanical sealing mechanism to completely temporarily enclose the waste within the plastic bag portion and sealing odor via the nipped rollers pinning closed the opening of the continuous plastic bag supply tubing, without requiring a permanent sealing at a second end; and advancing the filled bag portion downwardly into the bottom receiving container. This method may further include the step of activating the mechanical sealing mechanism and advancing the filled bag portion with a spring-loaded foot pedal, thereby providing a waterless faux-flushing action.

This invention may include a system for providing waterless sanitation comprising a waterless toilet comprising a top seating unit matingly connected to a bottom receiving container, the top seating unit further comprising a bag cartridge including a continuous plastic tube that feeds into a mechanical sealing mechanism. The mechanical sealing mechanism is operable for completely sealing a waste-filled portion of the continuous plastic tube to form a sealed bag, and advancing the sealed bag into the bottom receiving container, thereby providing a sanitary, waterless waste disposal system. In the most preferred embodiments, a continuous tube of plastic material is provided for receiving the waste, wherein a first end is formed by sealing or closing the tip of the tube to form an elongated continuous bag supply, without disconnectable individual bags for waste. Furthermore, the continuous plastic tube may further include an anti-microbial material for decontaminating waste. The system may further including a spring-loaded foot pedal to activate the mechanical sealing mechanism and/or to advance the waste-filled portion and sealed bag to create a faux-flushing action. The top seating unit may further include a lid pivotally connected to a seat, wherein the seat includes an opening for waste to be deposited. The bag cartridge may be removably connected to the top seating unit. The top seating unit and the bottom receiving container may be formed of a hard plastic material. The mechanical sealing mechanism may further include four interactive gears connected by sealing rods that cooperate to cinch and to seal the continuous tubing to form sealed waste-filled bags when activated.

The present invention may include a method for providing waterless sanitation, comprising the first step of providing a waterless toilet system comprising a bottom receiving container and a top seating unit, the top seating unit further including a bag cartridge, a plastic tube including a first end, and a mechanical sealing mechanism. In an alternate embodiment, the plastic tube is housed within the bag cartridge and the first end is positioned for advancement from the bag cartridge, and, further, the top seating unit is positioned above the bottom receiving unit and edges of the top seating unit and bottom receiving container are connected to form a seal. The subsequent steps include: advancing the first end of the plastic tube from the bag cartridge to the mechanical sealing mechanism; activating the mechanical sealing mechanism, thereby sealing the first end of the plastic tube to form an open bag; filling the open bag with waste; activating the mechanical sealing mechanism, thereby creating a second seal in the plastic tube to enclose the waste within a sealed bag; and advancing the sealed bag downwardly into the bottom receiving container. Alternatively, the step of activating the mechanical sealing mechanism may additionally include depressing a spring-loaded foot pedal.

An alternative embodiment of the present invention may include a system for providing waterless sanitation with a waterless toilet is comprised of a bottom receiving container a top seating unit, the top seating unit including a bag cartridge, a plastic tube including a first end, and a mechanical sealing mechanism. The plastic tube is housed within the bag cartridge and the first end is positioned for advancement from the bag cartridge. Furthermore, the top seating unit is positioned above the bottom receiving unit and edges of the top seating unit and bottom receiving container are connected to form a seal. The mechanical sealing mechanism is operable to completely seal a waste-filled portion of the plastic tube, thereby creating a sealed bag and is further operable to advance the sealed bag into the bottom receiving container. The plastic tube may further include an anti-microbial material for waste decontamination. The system may further include a spring-loaded foot pedal configured to activate the mechanical sealing mechanism and/or advance the sealed bag. The top seating unit may further include a lid pivotally connected to a seat, wherein the seat includes an opening for waste to be deposited. The bag cartridge may additionally be removably connected to the top seating unit. The top seating unit and the bottom receiving container may be formed of a hard plastic material. The mechanical sealing mechanism may further include four interactive gears connected by sealing rods that cooperate to cinch and to seal the plastic tubing to form the filled bags upon activation.

The present invention provides for a portable waterless toilet that is advantageously used in a variety of locations and applications, especially mobile environments, such as by way of example and not limitation, toilets used in recreational vehicles, trailers, airplanes, trains, buses, ships, boats, watercraft, and spacecraft. Because the portable waterless toilet of the present invention does not require plumbing or ventilation systems, and fully sealingly encloses the waste as described hereinabove, it can be installed in these environments without extensive site preparation or modification and also is applicable in environmentally sensitive areas, either for temporary or permanent installation or usage. Additionally, the present invention provides for use in mobile environments because there is no environmental discharge or need for continuous ventilation. Furthermore, on-site cleaning and maintenance is rapid and reduced compared to standard water-based flushing toilets, as a toilet in need of service can simply be substituted with a working toilet and taken to a dedicated facility for repair. Thus, the present invention is ideal for environments where portable toilets are traditionally used, such as construction sites and events.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention and the claims.

The invention claimed is:

1. A method for providing portable waterless sanitation for mobile environments comprising the steps of:
    providing a portable waterless toilet system comprising a top seating unit matingly connected to a bottom receiving container, the top seating unit further comprising a seat with an opening, a lid with a urea dispenser, a lid hinge with a slow-closing mechanism, a lid-tipping mechanism, the hinge connecting the lid to the top seating unit; and a continuous plastic bag supply;
    the bottom receiving container further comprising a pedal-activated mechanical sealing mechanism including a pedal and rollers, wherein the pedal is operable for activating the sealing mechanism and the lid-tipping mechanism;
    the continuous bag supply feeding into the mechanical sealing mechanism; advancing the continuous plastic bag supply through the mechanical sealing mechanism;

activating the mechanical sealing mechanism to create a seal at a first end of the plastic bag supply to form a bag portion, wherein the seal is created by a nip line formed between the rollers;

providing a bag opening corresponding to the seat opening to allow receiving of a waste into the bag portion;

activating the pedal to tip the lid to close, dispense urea into the continuous bag supply and to activate and advance the mechanical sealing mechanism to completely enclose the waste within the continuous plastic bag supply by temporarily sealing a second end of the plastic bag supply when the nip line is formed between two aligned rollers;

advancing the filled portion of the continuous plastic bag supply downwardly into the bottom receiving container and advancing the continuous plastic bag supply;

wherein the slow-closing mechanism is restrained from a gravity-based closing, such that a pre-calculated amount of urea flows or falls into the bag portion exposed for receiving the waste and is deposited for the next usage of the waterless toilet system.

2. The method of claim 1, wherein the continuous plastic bag supply further includes an anti-microbial material for decontaminating waste.

3. The method of claim 1, wherein the lid contains a waste-treatment material and deposits a predetermined amount of the material into the bag when opened.

4. The method of claim 1, wherein the mobile environment includes planes, trains, automobiles, buses, ships, and spacecraft.

5. A system for providing portable, waterless sanitation for mobile environments comprising:
a waterless toilet including
a receiving container, a seat with an opening, a lid with a urea dispenser and a slow-close mechanism, a continuous plastic bag supply, a mechanical sealing mechanism, a lid-tipping mechanism, and a pedal;
the lid-tipping mechanism and the mechanical sealing mechanism both activated simultaneously by the pedal when the pedal is activated;
the lid pivotally connected to the seat and automatically closing in a controlled, smooth manner into a resting position over the toilet when the pedal is activated;
the urea dispenser dispensing urea into the continuous bag supply as the lid closes;
the mechanical sealing mechanism activating and advancing the continuous bag supply when the pedal is activated;
the continuous plastic bag supply constructed and configured to feed into the mechanical sealing mechanism;
wherein the mechanical sealing mechanism is operable for temporarily sealing a waste-filled portion of the continuous plastic bag supply to form a sealed bag, and advancing the sealed bag into the receiving container;
thereby providing a sanitary, waterless waste disposal system.

6. The system of claim 5, wherein the continuous plastic bag supply further includes an anti-microbial material for decontaminating waste.

7. The system of claim 5, wherein the lid contains a waste-treatment material and deposits a predetermined amount of the material into the bag when opened.

8. The system of claim 1, wherein the mobile environment includes planes, trains, automobiles, buses, ships, and spacecraft.

9. The system of claim 1, wherein the slow-close lid closing mechanism restrains the lid from a merely gravity-based closing.

10. A portable sanitation apparatus for waterless, odorless waste receiving and disposal in a mobile environment comprising:
a portable toilet with a lid and urea dispenser that uses a continuous bag;
the portable toilet having a pedal-operated mechanism to simultaneously close the lid, dispense urea into the continuous bag supply, advance the continuous bag supply and activate a bag-sealing mechanism;
and wherein the waste-filled continuous bag supply is at least temporarily sealed by activation of the bag-sealing mechanism, and released downwardly into a base section, which is connected to a sitting unit, forming an integral, closed system for waterless sanitation.

11. The portable sanitation apparatus of claim 10, further including a slow-close mechanism that closes the lid in a slow, controlled manner.

12. The portable sanitation apparatus of claim 10, wherein the slow-close mechanism restrains the lid from a merely gravity-based closing.

13. The portable sanitation apparatus of claim 10, wherein the continuous plastic bag supply further includes an anti-microbial material for decontaminating waste.

14. The portable sanitation apparatus of claim 10, wherein the lid contains a waste-treatment material and deposits a predetermined amount of the material into the bag when opened.

15. The portable sanitation apparatus of claim 10, wherein the mobile environment includes planes, trains, automobiles, buses, ships, and spacecraft.

* * * * *